Sept. 25, 1923. Re. 15,689
C. D. TUSKA
CONDENSER
Original Filed March 29, 1919
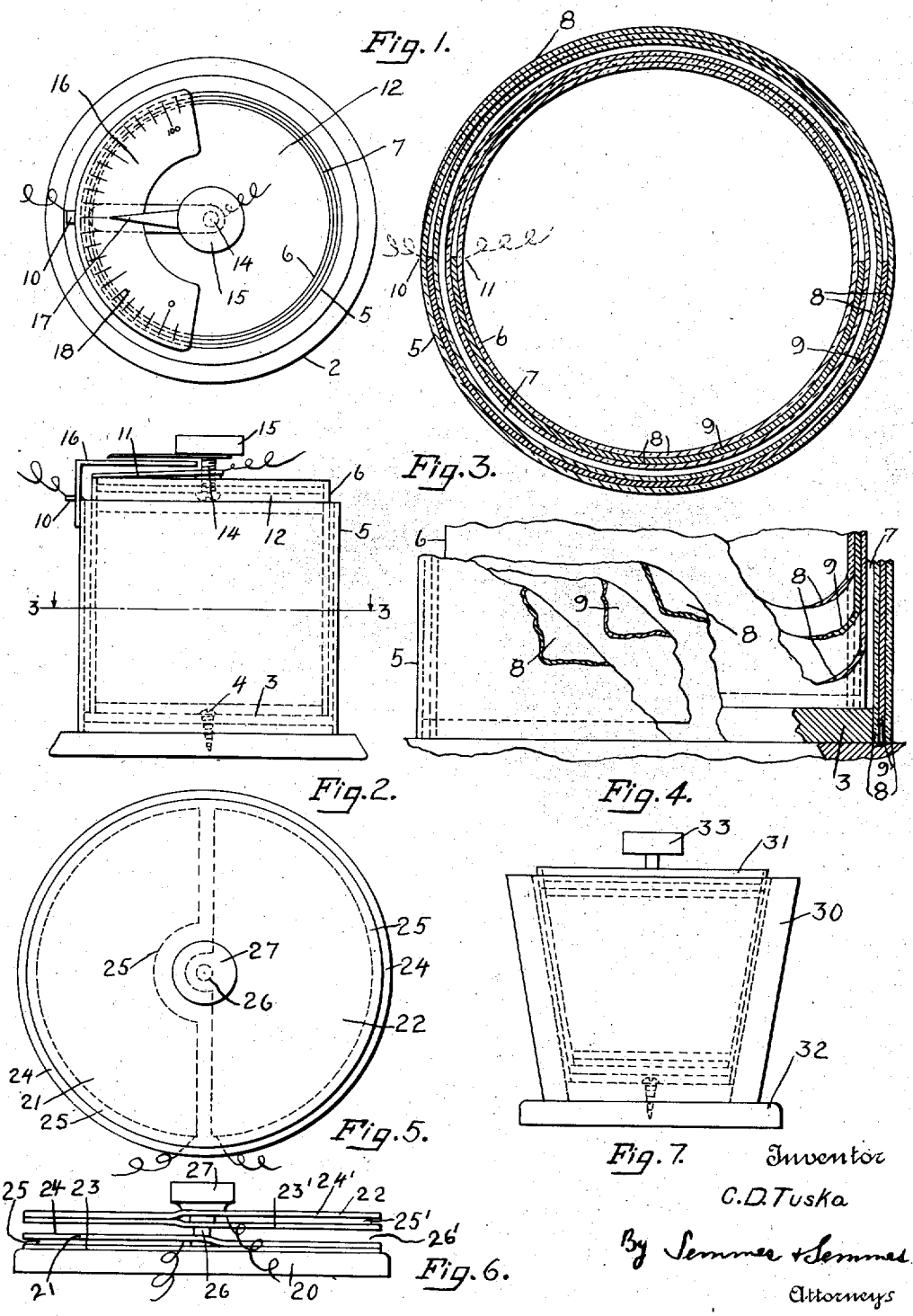
Inventor
C. D. Tuska
By Semmes & Semmes
Attorneys Reissued Sept. 25, 1923. Re. 15,689

UNITED STATES PATENT OFFICE.

CLARENCE D. TUSKA, OF HARTFORD, CONNECTICUT, ASSIGNOR TO DUBILIER CONDENSER AND RADIO CORPORATION, OF NEW YORK, N. Y., A CORPORATION OF DELAWARE.

CONDENSER.

Original No. 1,371,061, dated March 8, 1921, Serial No. 286,190, filed March 29, 1919. Application for reissue filed February 21, 1923. Serial No. 620,534.

*To all whom it may concern:*

Be it known that I, CLARENCE D. TUSKA, a citizen of the United States, residing at Hartford, in the county of Hartford and State of Connecticut, have invented certain new and useful Improvements in Condensers, of which the following is a specification.

This invention relates to condensers. A condenser involving the invention may be employed with utility in various ways in the electric and allied arts, although in practice it has demonstrated particular advantage as part of the equipment of a wireless telegraph station. I have several objects in view, among the principal of them being the provision of an appliance of the character set forth, which is capable of inexpensive production, without in any wise affecting its proper action. The device is comparatively light, yet strong, and it can be readily and easily operated to adjust or regulate its capacity. It may be constructed in various ways. In the drawings accompanying and forming part of the present specification, I have illustrated somewhat fully and will hereinafter describe in detail several of the many forms of the invention. This disclosure is primarily made to enable those skilled in the art to practice the invention. I am not restricted thereto. I may in fact depart therefrom in several particulars within the scope of the invention defined by the claims following said description.

Referring to said drawings—

Figure 1 is a top plan view of a condenser involving the invention.

Fig. 2 is an elevation of the same.

Fig. 3 is a transverse section of the body part of the condenser.

Fig. 4 is a detail in sectional elevation, of the lower part of the condenser with several plies folded back and partly broken away.

Fig. 5 is a plan view of another form.

Fig. 6 is an elevation of the same.

Fig. 7 is an elevation of a further form of condenser.

Like characters refer to like parts throughout the several views which are on different scales.

The condenser involves in its makeup at least two elements which are relatively adjustable to vary capacity. This relative adjustment, as will be inferred, may be obtained in various ways. Usually, it is accomplished by the adjustment of one of the members or elements with respect to the other, yet this may not be necessary in all cases. At least one or both of these elements comprises a plurality of portions desirably flexible. For illustration, I have obtained excellent results by making one portion, that is the insulating portion of some flexible material such as paper stock of which there are several kinds. I might note at this juncture that paper sheet material or thin board answers quite satisfactorily indeed. Likewise, the conducting part or portion of each element may vary. Satisfactory results have been obtained by the utilization of foil, such as tin-foil. Each portion or part, therefore, of each member or element, as I have considered the same, of the condenser is thus flexible.

With the foregoing observations, I will now describe more definitely the structure shown, and will first refer to the illustration made by Figs. 1 to 4 inclusive. There is a support base which may also vary. That shown is denoted by 2 and is in the form of a disk of wood or other proper substance. The base or support has as shown fastened to its upper surface centrally thereof the disk 3, the screw 4 being shown to hold said disk to the support 2.

The body of the condenser illustrated in these four views, which I am now specifically describing, is in the form of a plurality of members of which there are two shown, being denoted respectively by 5 and 6. These members 5 and 6 are in the form of hollow cylinders or tubes, the inner tube or cylinder 6 being separated by, for instance, a space 7 from the outer tube 5. Ordinarily the inner tube is rotatively adjustable to vary capacity. The outer tube 5 at its lower portion closely surrounds the disk 3. The cylinder or tube 6 is sustained by the disk 3 and extends slightly above the cylinder 5.

The cylinders, structurally speaking and otherwise as a matter of fact, are virtually duplicates of each other so that a description of one will apply to the other. The cylinder 5 consists of an outer or enveloping part as 8 of paper stock, and an inner part 9 of tin-foil. While the paper stock 8 wholly incloses the tin-foil, this may not always be necessary. The paper and tin-foil are usually adhesively united in some convenient way. It will be seen, upon reference to Fig. 3, for instance, that the width or transverse extension of the tin-foil ply or sheet 9 is approximately equal to one-half the circumferential extent of the tube 5. Although the paper stock wholly covers and incloses the tin-foil, this may not always be necessary. In this particular view the two tin-foil portions are shown in exact registration or directly opposite each other, so that thereby I secure the maximum capacity of the condenser. By moving the tin-foil sheets out of register, the capacity of the condenser is reduced to zero; this capacity may obviously be adjusted to any point from zero to the maximum, by turning the tube 6 within the tube 5.

A terminal as 10 is connected electrically with the tin-foil ply or sheet 9 of the outer tube while a somewhat similar terminal as 11 is similarly connected with the tin-foil ply or sheet of the inner tube 6.

To turn the inner tube 6 for regulation of capacity, any suitable means may be provided, for instance, that shown and now to be described. In the upper end of the inner tube 6 is set a head 12, for example, of wood, through which is threaded the spindle 14 having at its upper end a manipulating knob 15. By turning this knob the inner cylinder 6 may be likewise turned to adjust capacity.

The shank of a gage 16 may be fastened in some convenient way to the stationary or fixed cylinder, the gage portion of the gage overhanging the head 12, and there being above it and cooperative therewith the pointer 17 fastened at its butt to the spindle or screw 14, the pointer, as the spindle is turned, moving therewith and across the graduations 18 of the operative portion or scale of the gage member 16.

In Figs. 5 and 6 I show a flat construction. The base in this type is denoted by 20 and the elements or members of the active condensing portion by 21 and 22 respectively. In this kind of condenser the member 21 is practically of half disk formation, the member 22 being a complete disk. Said member 21 consists of superposed half disks 23 and 24 of paper and an interposed half disk sheet 25 of tin-foil, the tin-foil being so disposed between the paper sheets 23 and 24 that there will be a selvage or marginal portion of paper material entirely around the tin-foil. The adjustable member 22 of disk form is fastened to the spindle 26 supported for turning movement by the base 20. The spindle 26 has a manipulating knob or finger piece 27 at its other end to facilitate its adjustment. This spindle rotates freely in the member 21. Through the member 22 the spindle 26 fixedly extends. This member 22 consists as shown of disks 23′ and 24′ and an interposed half disk 25′ of tin-foil.

In order to show the construction illustrated in Figs. 5 and 6 it has been necessary to separate the elements of the condenser much further than actually occurs in practice. For instance, in a condenser having a capacity of .0002 M. F. the stationary elements of the condenser represented by the numeral 21 would present a practically flat upper surface because the half disk sheet 25 of tin-foil would be only .0015 inch thick.

The lower face 23′ of the upper or adjustable elements designated by the numeral 22 would also have a substantially flat lower face which would practically engage the upper face 24 of the member 21. Therefore, the space 26′ as shown in Fig. 6, if existing at all in practice, would be exceedingly minute.

It will further be observed that the adjustable member 22 is, as a whole, flexible, and therefore readily conforms itself to any inequality in the upper surface of the member 21.

It is obvious that this form of condenser may be so constructed that the spindle 26 need not be in electrical contact with either of the active conducting plates of the condenser which may be provided with any form of suitable terminals, not shown.

In Fig. 7 the condenser comprises members or elements as 30 and 31. These members or elements 30 and 31, except as to one point, to which I will later refer, are mounted and operated almost exactly like the members or elements 5 and 6 which I have set forth so fully in detail. The supporting base is denoted by 32, the element 30 being rigid with it and the element 31 being turnable in the part 30 through the agency for example of the knob 33. These elements 30 and 31 are of tubular or hollow construction, the principal and in fact really the only difference between them and the parts 5 and 6 being that the parts 30 and 31 are of inverted frusto-conical form and are not therefore, cylindrical. In all three forms of the condenser it will be seen that the marginal portion of the paper, or equivalent material, overlies the foil so as to leave a margin or selvage of paper.

What I claim is:

1. A condenser comprising a plurality of coaxial relatively turnably adjustable elements, each element being flexible and having insulating and conducting sections.

2. A condenser comprising relatively adjustable elements, each flexible and having insulating and conducting sections, the insulating sections wholly inclosing the conducting sections.

3. A condenser comprising coaxial relatively adjustable elements, each flexible and having insulating and conducting sections, the respective conducting sections being wholly inclosed in the insulating sections and the marginal portions of the respective insulating sections extending outward beyond the marginal portions of the conducting sections.

4. A condenser comprising coaxial relatively turnably adjustable elements, each of paper stock and metal foil.

5. A condenser comprising elements each of paper stock and metal foil and relatively adjustable to vary the capacity of the condenser.

6. A condenser comprising elements each of sheet paper stock and metal foil and relatively adjustable to vary the capacity of the condenser.

7. A condenser comprising tubular elements, one inclosed by another and each of paper stock and metal foil.

8. A condenser comprising tubular coaxial elements each of paper and foil and relatively adjustable about their common axis.

9. A condenser comprising tubular elements, one inclosed by another and of paper stock and metal, the paper stock inclosing the metal foil and the marginal portions thereof extending outward beyond the marginal portions of the foil, the elements being relatively adjustable about their common axis to vary the capacity of the condenser.

10. A condenser comprising spaced coaxial tubular elements, one inclosed by another, each of sheet paper and tin-foil, the sheet paper wholly inclosing the tin-foil and each of the paper portions of the elements extending outward beyond the marginal portions of the tin-foil, the elements being relatively adjustable about their common axis to vary the capacity of the condenser.

11. A variable condenser comprising, a flexible adjustable element comprising a conducting member, a fixed element having a conducting member provided with insulating material on one side, and an insulating layer covering the other side of said last mentioned conducting member adjacent the adjustable element.

12. A variable condenser comprising, a fixed element having a conducting layer covered on both surfaces by insulating material, and a flexible movable element having conducting material adapted to be moved to vary the capacity of the condenser.

13. A variable condenser comprising, a fixed element having a sheet of conducting material provided with insulating material on one side, a flexible movable element having a sheet of conducting material, and a sheet of insulating material between said sheets of conducting material and attached to the conducting sheet of the fixed element.

14. A variable condenser comprising, a fixed element having a conducting layer and insulating material secured to both faces thereof, and a flexible movable element adapted to be moved to vary the capacity of the condenser.

15. In a variable condenser, a fixed conducting element comprising a sheet of foil having a sheet of insulating material on one face and insulating material on its other face, and a flexible rotatable conducting element mounted adjacent to said sheet of insulating material.

16. In a condenser, a flexible movable element comprising conducting material, and a tubular fixed element comprising conducing material having solid insulating material covering its face adjacent the movable element.

17. In a condenser, a flexible element comprising conducting material, another element of substantially tubular configuration comprising conducting material and a covering of solid insulating material on its face adjacent the first named element, and means to vary the relation of the elements to vary the capacity.

18. A variable condenser comprising, a flexible adjustable element having a conducting member, and a fixed element having a conducting member provided with solid insulation on one face thereof, and a layer of insulation attached to the other face thereof adjacent to the adjustable element.

19. A variable condenser comprising, a fixed electrode having conducting material, an insulating material wholly enclosing the conducting material, and a flexible movable electrode.

20. A variable condenser comprising, a fixed electrode having a sheet of metallic foil, a flexible movable electrode, and a flexible insulating sheet fixed over the metallic foil of the fixed electrode.

21. A variable condenser comprising, a support member, a fixed element supported thereby, a layer of insulating material upon the upper surface of said fixed element, and a flexible movable element of conducting material substantially contacting with said insulating layer and adapted to be moved to vary the capacity of the condenser.

22. A variable condenser comprising a fixed conducting element, a layer of insulating material thereupon, and a flexible movable element having conducting material adapted to be moved to vary the capacity of the condenser and adapted to contact upon the said insulating material.

23. In a variable condenser, a fixed element, a dielectric member overlaying said fixed element, and a flexible element adapted to be moved to vary the capacity of the condenser and arranged to contact with the surface of the said dielectric member.

24. In a variable condenser, a fixed element, a dielectric member overlaying said fixed element, a flexible element in contact with said dielectric member, and means including a member projecting from the condenser for moving said flexible member whereby the capacity of the condenser may be varied.

25. In a variable condenser, a support, a fixed element wholly immovable at all points, a flexible movable element, means for changing the position of the movable element for varying the capacity of the condenser, a calibrated scale carried by said support, and a pointer moving with said above mentioned means for co-operating with said scale to indicate the adjustment of the condenser.

In testimony whereof I affix my signature.

CLARENCE D. TUSKA.